Patented May 24, 1932

1,860,036

UNITED STATES PATENT OFFICE

GEORG KRÄNZLEIN, CHRISTOPH HARTMANN, AND ALBIN HARDT, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

PIGMENT DYES

No Drawing. Application filed August 11, 1928, Serial No. 299,107, and in Germany September 11, 1926.

Our present invention relates to pigment dyes, more particularly to pigment dyes being salts formed on the one side from an organic dyestuff containing acid salt-forming groups and on the other side from a cyclic organic base of the following general formula:

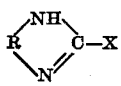

wherein R stands for a bivalent hydrocarbon radical and X for hydrogen or for one of the groups alkyl, aryl, amino, alkylimino or arylimino, substituted or not.

We have found that dyestuffs containing one or several acid groups, including their water-soluble complex compounds with inorganic substances, as, for instance, soluble chromium compounds, copper compounds and alumina compounds (cf. U. S. Patent specification No. 1,090,123 issued March 10, 1914, in the name of René Bohn and Karl Immerheiser, German patent specification No. 416,379 in the name of Gesellschaft für chemische Industrie in Basel and German patent specification 419,825 in the name of Badische Anilin- & Soda-Fabrik), can be converted into pigments in an excellent manner by adding to an aqueous solution of a salt of the dyestuffs in question an aqueous solution of a base or a salt thereof, which base has a basicity sufficiently great for the formation of a stable salt incapable of being hydrolyzed or capable of being hydrolyzed only with difficulty, and also renders the dyestuff insoluble or sparingly soluble in water.

As such basic organic materials have proved to be particularly useful cyclic bases of the following general formula:

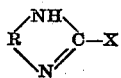

wherein R stands for a bivalent hydrocarbon radical and X for hydrogen, alkyl or aryl, substituted or not, or for the amino group which may also be substituted, as, for instance: 2-methyl-benzimidazol of the formula:

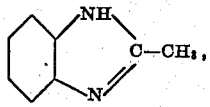

2-aminobenzimidazol, 2-alkylaminobenzimidazols and 2-arylaminobenzimidazols, 2-amino-perimidine of the formula

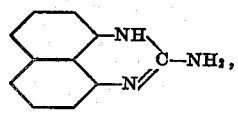

2-alkylamino-perimidines and 2-arylaminoperimidines, 2-hexahydroanilino-4.5-dihydroimidazol of the formula:

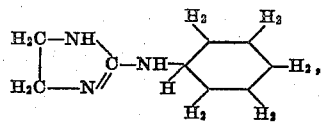

2-toluido-4.5-dihydroimidazol of the formula

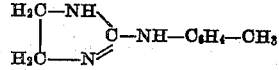

or the like and substitution products thereof.

The same pigments can also be obtained by causing the free dyestuff acid to react with the free base, if necessary in a suitable solvent, as, for instance, concentrated or aqueous alcohol. In this case the pigments, if they are to be isolated, must be prepared by precipitating them from their alcoholic solution by means of agents, such as, for instance, water, or by evaporation.

The following examples are given by way of illustration, it being understood that they are not limitative in any way. The parts are by weight:

(1) 63 parts of the dyestuff of the formula:

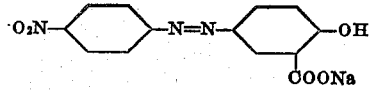

are dissolved in about 2000 parts of water, and to this solution there is added at room temperature a solution of 50 parts of 2-ortho-toluido-benzimidazol of the formula:

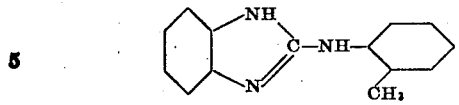

in the calculated quantity of dilute hydrochloric acid. The yellow precipitate is filtered by suction and dried. It is an orange-yellow powder, soluble in concentrated sulfuric acid, in acetone and in benzyl alcohol to a reddish-yellow, in alcohol and benzene to a yellow solution.

In the preceding example the azo dyestuff may advantageously be replaced by the combination ortho-aniline-sulfonic acid coupled with 1-ortho-sulfophenyl-5-pyrazolone-3-carboxylic acid or para-anilinesulfonic acid coupled with 1.2'-chloro-5'-sulfophenyl-3-methyl-5-pyrazolone.

(2) To an aqueous solution of 20 parts of the dyestuff of the formula:

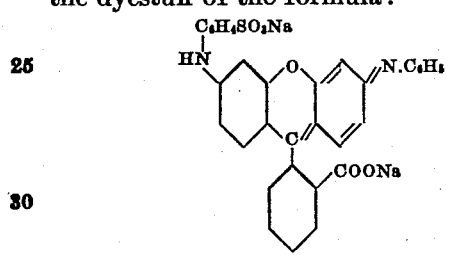

there is added at about 10° C. to 20° C. a solution of 10 parts of 2-methylbenzimidazol of the formula

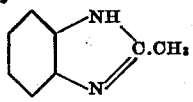

(about two molecular proportions) in the calculated quantity of dilute hydrochloric acid. The resulting precipitate is filtered and dried. It is a dark violet powder, almost insoluble in water, soluble in alcohol to a reddish-violet and in benzyl alcohol to a bluish-violet solution. The color of its solution in concentrated sulfuric acid is yellowish-red which on addition of formaldehyde gradually turns to bluish-red.

(3) 10 parts of the dyestuff:

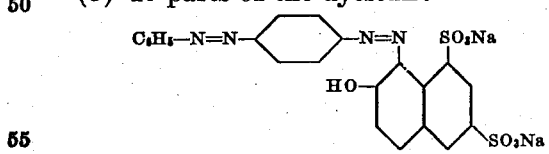

are precipitated in an aqueous solution at room temperature with a neutral solution of 6.5 parts of 2-hexahydroanilino-4.5-dihydroimidazol of the formula:

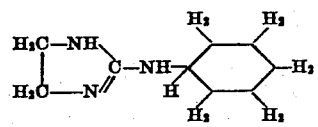

in the calculated quantity of dilute hydrochloric acid. The precipitate is filtered by suction and dried. It is a red powder, dissolving to red solutions in alcohol, acetone, butanol, benzyl alcohol and pyrantone, furthermore in alcohol lacquers, cellulose-ester and -ether lacquers, and nitrocellulose lacquers.

(4) 10 parts of the dyestuff:

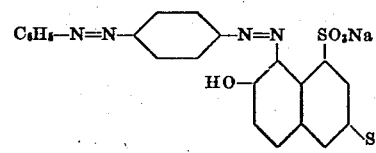

are precipitated in an aqueous solution at room temperature with a neutral solution of 8 parts of 2-anilino-benzimidazol of the formula:

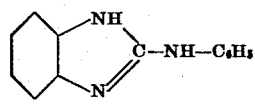

in dilute hydrochloric acid. After being isolated and dried, the dyestuff forms a red powder, soluble to red solutions in alcohol, methyl alcohol, butanol, benzyl alcohol, pyrantone, and also in alcohol lacquers, cellulose-ester and -ether lacquers and nitrocellulose lacquers.

For the base used in this example there may advantageously be substituted its substitution products, particularly its mono- and dimethyl derivatives, both those substituted in the benzene nucleus and at the nitrogen.

(5) 10 parts of the dyestuff:

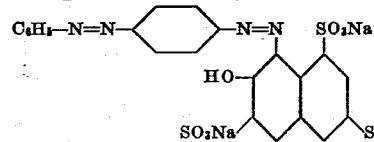

are precipitated in an aqueous solution with a warm solution of 12 parts of 2-anilidoperimidine of the formula:

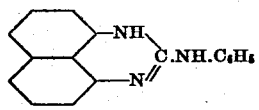

in water and the calculated quantity of hydrochloric acid. The resulting compound when separated and dried constitutes a red powder of about the same solubility as the dyestuff obtainable according to the preceding example.

For the anilidoperimidine used in this example there may be substituted similar compounds, as, for instance, 2-amino-perimidine of the formula:

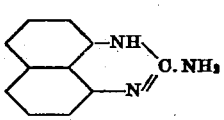

(6) 17 parts of sodium 1-amino-4-phenylaminoanthraquinone-2-sulfonate are precipitated in the manner above indicated with a neutral solution of 7 parts of 2-toluido-4.5-dihydroimidazol in dilute hydrochloric acid. The dried precipitate is a blue powder showing the same properties of solubility as the dyestuff prepared in Example 4.

(7) A neutral solution of 17 parts of 2-toluido-4.5-dihydroimidazol in dilute hydrochloric acid is run, while stirring, into an aqueous solution of 60 parts of the chromium complex salt of 2.4-naphtholsulfonic acid-1-azo-nitrophenyl-methyl-pyrazolone-sulfamide. The red precipitate is filtered by suction, dried at 50° C. to 60° C. and very finely ground. The red powder readily dissolves in methyl alcohol, rather difficultly in alcohol, and it is soluble in alcohol lacquers, cellulose-ester and -ether lacquers, and nitrocellulose lacquers, insoluble in benzine, benzene and benzylacetate.

Instead of the dyestuffs named in the preceding examples there may be used for producing the pigment dyes in like manner other dyestuffs of the most various classes of dyestuffs, provided only that they contain acid salt-forming groups, as, for instance, 1-amino-4-para-acetaminoanilido-2-anthraquinonesulfonic acid of the formula

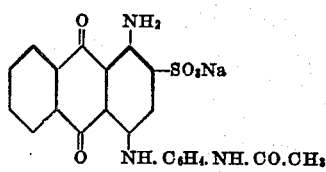

1.4-dihydroxy-5.8-di-para-toluidoanthraquinonedisulfonic acid, 1.5-dihydroxy-4.8-di-para-toluidoanthraquinonedisulfonic acid, 1.4-diamidoanthraquinone-2-sulfonic acid, 1-hydroxy-4-para-toluidoanthraquinonesulfonic acid, 1.5-di-para-toluidoanthraquinone-disulfonic acid, anthrapyrimidine-4-para-toluidosulfonic acid of the formula:

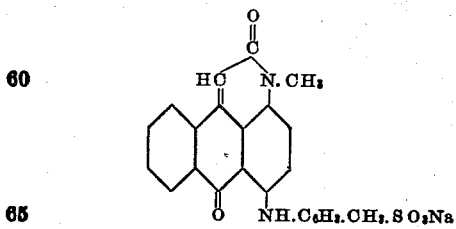

methylanthrapyridone-4-arylsulfonic acids of the formula:

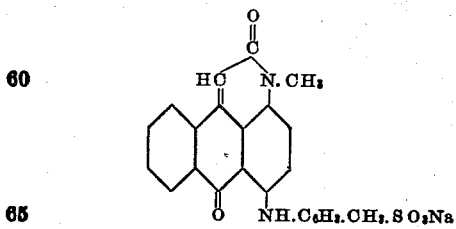

1.4-diaminoanthraquinone-2-phenoxysulfonic acid of the formula:

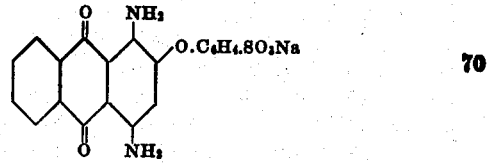

alumina lacquers of polyhydroxyanthraquinonesulfonic acids or salts thereof, as, for instance, of alizarinesulfonic acid or of sodium hexahydroxyanthraquinone-3.7-disulfonate. Furthermore the dyestuff of the following formula:

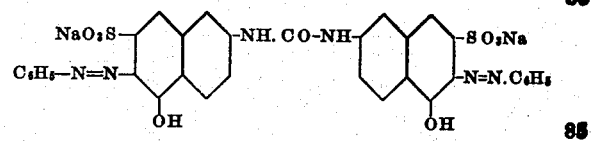

or the dyestuff of the formula:

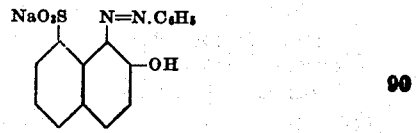

or rhodamines or triphenylmethane dyestuffs, as for example the acid triphenylmethane dyestuff of the formula:

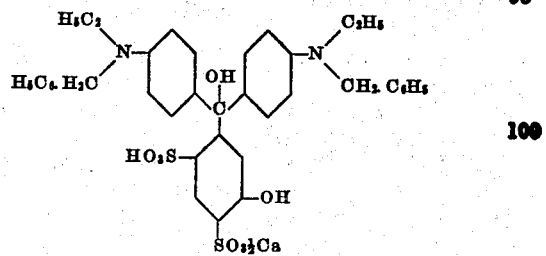

or the dyestuff of the following formula:

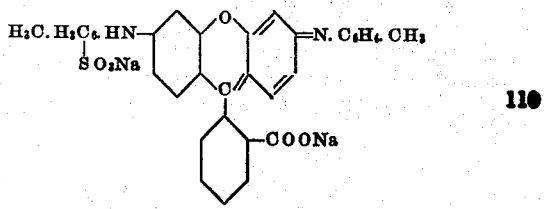

obtainable by the action of ortho-toluidine upon fluoresceïn chloride and sulfonation of the reaction product, and other dyestuffs.

For preparing water-insoluble or sparingly-soluble precipitates, the organic bases used as precipitating agents for each of the dyestuffs indicated may also be used in any desired combination to any of the other-enumerated dyestuffs and generally to all dyestuffs containing acid salt-forming groups.

The preceding examples form only a small part of the pigments obtainable by suitably selecting the bases and dyestuffs. They are particularly useful and of strong coloring power, and they yield tints of good fastness to light.

The said pigment dyes are insoluble or difficultly soluble in water, but soluble in many organic solvents, some of them being otherwise known as solvents for cellulose esters or cellulose ethers and for lacquers. Therefore said pigment dyes are useful in dyeing solutions of cellulose ethers and cellulose esters and of lacquers in organic solvents.

The pigments as such or after being mechanically mixed in a dry way with one of the usual substrata, as, for instance, hydrate of alumina, heavy spar, blanc fixe, or a mixture thereof, may be mixed with varnish and printed, or mixed with linseed oil and applied with a brush, or mixed with an aqueous binding agent and applied with a brush, or the pigments are mixed in the form of an aqueous paste with the dry or water-moist usual substrata, for example those above indicated, dried and mixed with varnish as above described; they yield very intense clear shades of very good fastness to light.

The precipitation of the dyestuff salts with the salts of the organic bases or the reaction of the free dyestuff acids with the free bases can, of course, also be effected in the presence of a substratum, as, for instance, of one of those above indicated, hydrate of alumina, heavy spar, blanc fixe or a mixture thereof.

We claim:

1. As a new product, the salt formed from the chromium complex salt of 2.4-naphthol-sulfonic acid-1-azo-nitro-phenyl-methyl-pyrazolone-sulfamide and from 2-toluido-4.5-dihydro-imidazol being a red powder, soluble in alcohol, methyl glycol, alcohol lacquers, cellulose-ester and -ether lacquers, and nitrocellulose lacquers and yielding a clear tint of great fastness to light.

2. As new products, the salts formed on the one side from an organic dyestuff containing at least one acid salt-forming group and on the other side from a cyclic-organic base of the general formula:

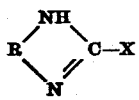

wherein R stands for a bivalent hydrocarbon radical of the group consisting of ethylene, phenylene and naphthylene and X stands for a substituent of the group consisting of hydrogen, methyl, amino, methylimino, phenylimino, tolyimino and cyclohexylimino, the said salts being insoluble or difficultly soluble in water, but soluble in alcohol, acetone, benzyl alcohol, butanol, cyclohexanone or cyclohexanol.

3. As new products, the salts formed on the one side from an azo dyestuff containing at least one acid salt-forming group and on the other side from a cyclic organic base of the general formula:

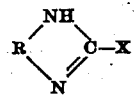

wherein R stands for a bivalent hydrocarbon radical of the group consisting of ethylene, phenylene and naphthylene, and X stands for a substituent of the group consisting of hydrogen, methyl, amino, methylimino, phenylimino, tolylimino and cyclohexylimino, the said salts being insoluble or difficultly soluble in water, but soluble in alcohol, acetone, benzyl alcohol, butanol, cyclohexanone or cyclohexanol.

4. As new products, the salts formed on the one side from an organic dyestuff containing at least one acid salt-forming group and on the other side from a 4.5-dihydro-imidazol-compound of the following general formula:

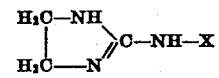

wherein X represents a radical of the group consisting of phenyl, tolyl and cyclohexyl, the said salts being insoluble or difficultly soluble in water, but soluble in alcohol, acetone benzyl alcohol, butanol, cyclohexanone or cyclohexanol.

5. As new products, the salts formed on the one side from an azo dyestuff containing at least one acid salt-forming group and on the other side from a 4.5-dihydroimidazol compound of the following general formula:

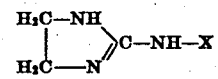

wherein X represents a radical of the group consisting of phenyl, tolyl and cyclohexyl, the said salts being insoluble or difficultly soluble in water, but soluble in alcohol, acetone, benzyl alcohol, butanol, cyclohexanone or cyclohexanol.

6. As a new product, the salt formed from the dyestuff of the following formula:

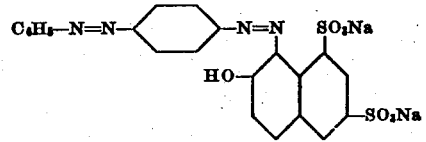

and from 2-hexahydroanilino-4.5-dihydro-imidazol, being a red powder, soluble in alcohol, acetone, butanol, benzyl alcohol, pyrantone, furthermore in alcohol lacquers, cellulose-ester and -ether lacquers and nitrocellulose lacquers.

In testimony whereof, we affix our signatures.

GEORG KRÄNZLEIN.
CHRISTOPH HARTMANN.
ALBIN HARDT.